(No Model.)

G. P. MERRILL.
FIFTH WHEEL.

No. 290,907. Patented Dec. 25, 1883.

Attest:
W. T. Cole
W. Chaffee

Inventor:
George Proctor Merrill,
by Ott W. T. Howard
attys.

UNITED STATES PATENT OFFICE.

GEORGE P. MERRILL, OF TOLEDO, ASSIGNOR OF ONE-HALF TO THOMAS L. BRANAN, OF BELLEVUE, OHIO.

FIFTH-WHEEL.

SPECIFICATION forming part of Letters Patent No. 290,907, dated December 25, 1883.

Application filed October 12, 1883. (No model.)

*To all whom it may concern:*

Be it known that I, GEORGE P. MERRILL, of Toledo, in the county of Lucas and State of Ohio, have invented certain Improvements in Fifth-Wheels, of which the following is a specification.

My invention has reference to fifth-wheels for vehicles; and it consists in the improvements hereinafter described and claimed.

Figure 1:
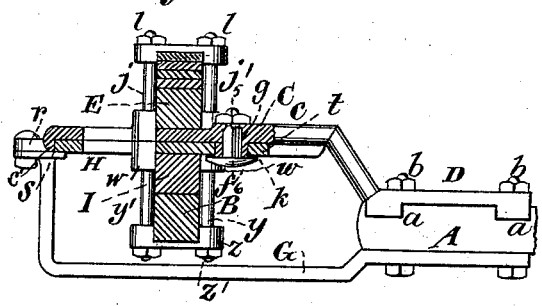
Figure 2:
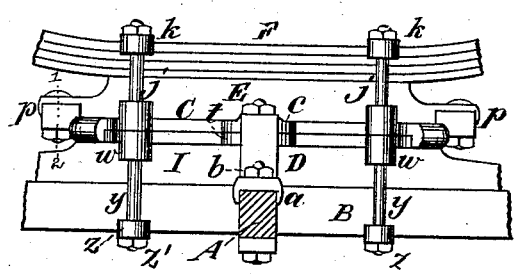
Figure 3:
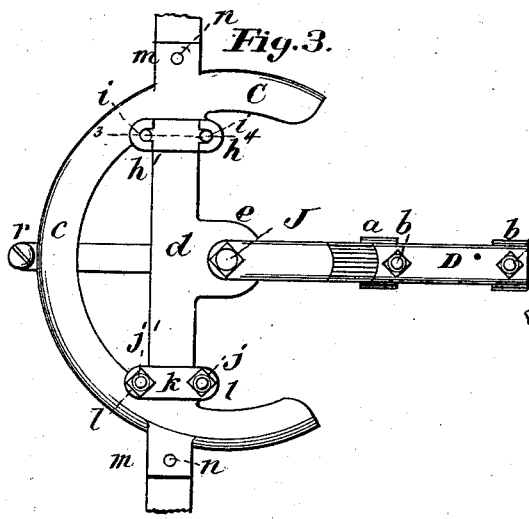
Figure 4:
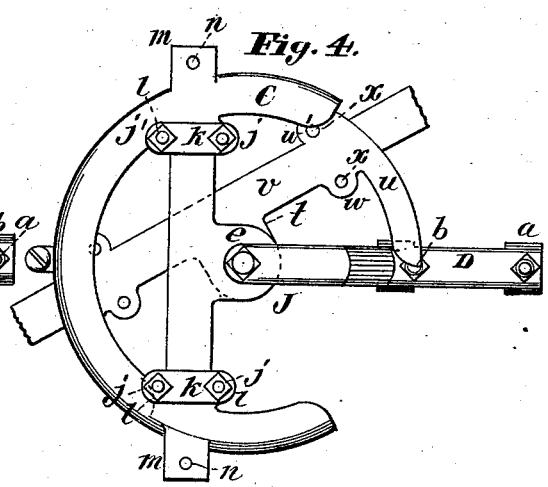
Figure 5:
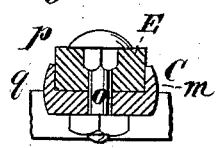
Figure 6:
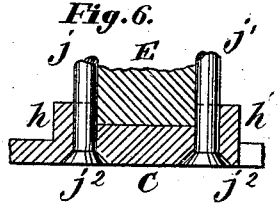
Figure 7:
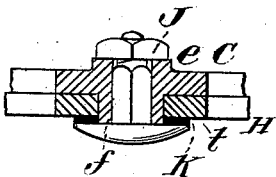

In the drawings, Figure 1 is a central longitudinal section of a fifth-wheel embodying my improvements. Fig. 2 is a rear elevation of the same. Fig. 3 is a plan, the lower axle being in its normal position with respect to the body; Fig. 4, the same, showing the lower axle turned to one side. Fig. 5 is a detail section on the line 1 2, Fig. 2; Fig. 6, the same, with addition of head-block, on the line 3 4, Fig. 3; and Fig. 7, the same, on the line 5 6, Fig. 1.

A represents a portion of the forward end of the reach of a vehicle, and B the forward axle of the same. An extension, D, of the upper segmental plate, C, of the fifth-wheel is secured to the upper face of the reach A by bolts and nuts $b\ b$, flanges or lips $a\ a$ of said extension resting against the sides of the reach and affording additional precaution against lateral displacement. The segmental portion $c$ and cross-bar $d$ of the plate C are elevated with respect to the extension D, so as to permit the axle, when in position, to stand in substantially the plane occupied by the reach A. A central platform, $e$, forming part of the cross-bar $d$ of the plate C, carries integrally on its under side a thimble, $f$, which thimble and platform have a vertical perforation, $g$. The cross-bar $d$ of the upper plate is provided on each side, near its junction with the segmental portion $c$, with lugs or ears $h\ h'$, having perforations $i$, which are countersunk at their lower ends, as shown in Fig. 6, to receive bolts $j\ j'$, having countersunk heads $j^2$, which heads lie snugly within the countersunk openings, flush with the under face of the ears.

Between bolts $j\ j'$ are the head-block E and the leaf members of the front spring, F, the said head-block and leaves being clamped therein by means of tie-plates $k$, resting transversely on the upper face of the spring F and perforated to receive the ends of the bolts $j\ j'$, threaded to receive nuts $l\ l$. To further provide against any possible play of the head-block E in the clamps, ears $m\ m$ are formed on the segmental portion $c$ on a line with the cross-bar $d$, and have perforations $n\ n$, through which bolts $o$ pass, and through corresponding perforations in the end extensions, $p\ p$, of the head-block, flanges $q\ q$ on the ears bearing against the sides of said extensions, as clearly seen in Fig. 5. A vertically-perforated ear, $r$, formed centrally on the segmental portion $c$ and on the periphery thereof, bears on a vertically-perforated platform, $s$, of an angle-bracket, G, extending back under the axle B, and secured to the under side of the reach A by bolts $b$. A bolt passes through the ear $r$ and platform $s$ and connects them rigidly together. The thimble $f$ of the platform $e$ bears in an opening in a platform, $t$, of the lower plate, H, of the fifth-wheel, which has also a segmental portion, $u$, and cross-bar $v$, as clearly shown in Fig. 4. The under side of the plate H is provided with depending lugs or ears $w\ w'$, arranged to be immediately below those of the upper plate, C, when the two plates are in a normal position with respect to each other, and are provided with openings $x$, countersunk at their upper ends and adapted to receive bolts $y\ y'$. Between said bolts $y\ y'$ are the axle B and axle-block I, the plate H being firmly clamped thereto by having clamp-plates $z$ bearing transversely on the under side and perforated for the threaded ends of the bolts $y\ y'$, to which said plate is secured by means of nuts $z'$. The thimble $f$ is secured in its bearings in the platform $t$ by the king-bolt and nut J, passing through the same, a gasket, K, being interposed between the head of the bolt and the lower plate, H, to prevent the turning of the bolt through frictional contact with the said plate H. The segmental portion $c$ of the upper plate has a flange, $c'$, which acts as a guard for the segmental portion $u$ of the under plate, H, in its movements, and in connection with said guard-flange $c'$ the platform $s$ of the bracket G is extended to form a bearing or support at the front end for the said segmental portion $u$.

From the foregoing description it will be apparent that the plates C and H are so arranged that they can be readily cast for use without further labor, their application to the reach and axle rendered easy, their retention thereto positive and rigid, and that the lower plate is capable of an extended movement on the thimble $f$ of the upper plate, which serves as a pivot therefor, thereby reducing the liability of the king-bolt to become loose and drop out.

It will also be obvious that by the arrangement of ears $h\ h'\ w\ w'$ and bolts $j\ j'\ y\ y'$ the parts are firmly clamped together without the heads of the bolts presenting obstruction to the movements of the plate H.

I claim—

1. The combination, in a fifth-wheel for vehicles, of an upper plate bolted to the reach of the vehicle, and having a perforated thimble bearing in an opening formed in a lower plate secured to the axle, a king-bolt passing through the perforation of the thimble and securing the plates together, and a bracket bolted to the reach and supporting both of the plates at their front, substantially as set forth.

2. The combination, in a fifth-wheel for vehicles, of plates C H, respectively bolted to the reach and to the axle and pivotally secured together, the upper plate having integrally an ear bolted to the platform of a bracket secured to the under side of the reach, the said platform of the bracket extending beneath a peripheral flange of the upper plate and beneath the lower plate, substantially as set forth.

In testimony whereof I have hereunto set my hand and seal this 27th day of June, A. D. 1883.

GEORGE P. MERRILL. [L. S.]

Witnesses:
CHAS. T. LEWIS,
IRVIN BELFORD.